Oct. 23, 1956

C. W. ERNST 2,767,565

PLATTER AND SUPPORTING HANDLES

Filed April 1, 1954

Inventor
CHARLES W. ERNST

By Howard Fischer

Attorney

United States Patent Office 2,767,565
Patented Oct. 23, 1956

2,767,565

PLATTER AND SUPPORTING HANDLES

Charles W. Ernst, St. Paul, Minn., assignor to Brown & Bigelow, St. Paul, Minn., a corporation of Minnesota Application April 1, 1954, Serial No. 420,416

6 Claims. (Cl. 65—15)

My invention relates to an improvement in a platter for cooking foods such as steaks etc. or keeping the same warm including handles, and more particularly to a platter having removable self-engaging handles adapted to simply and easily engage the same and maintain the platter in a position raised from the surface on which the platter is placed. With present day platters for use with hot foods the hot platter is usually supported by a dish-like support or positioned on removable handles which are difficult to get into position on the platter to aid in lifting the platter from a surface.

A feature of my invention resides in providing a platter which is preferably cast of aluminum and formed with an elongated well together with flange portions formed on the ends thereof. It is a further feature of my invention to provide handle members for each end of the platter which may be made out of wood and have formed therein an elongated slot or recess adapted to receive the end flange portions of the platter to hold the bottom of the platter off the surface on which platter rests.

It is also a feature to provide a handle formed with an arcuated cam or ramp which automatically directs the end lip or flange portion of the platter upwardly into the slot or recess of the handle as the same is pushed in a single plane against the end of the platter. The flange portion fits snugly into the slot or recess which maintains the bottom of the platter raised from a surface on which the handles are placed. With this construction the platter is easily and effectively placed in the handles ready to be lifted which is particularly desirable when the platter is hot.

It is an additional feature to provide a pair of identical slidable and stable handles each having the curved ramp portion. When the handles at each end of the platter are simultaneously pushed in a single plane against the ends of the platter, the platter is automatically elevated to a raised position forcing the end flanges of the platter up the ramp portion and into the engaging slots of the handles by a simple sliding movement of the handles against the flange end portions of the platter. It is a further feature to provide an elongated recess in the handle which frictionally receives the lip end portion of the platter to securely position the handles on the platter.

It is an additional feature to provide a block-like handle having a recess formed in the outer side thereof adapted to receive the fingers of the operator so that the handles are easily gripped and positioned on the platter so that the same may be lifted without actually touching the same. The recess for the fingers extends into the outer side portion of the handle to such an extent that when the operator's fingers are positioned in the recess they are underneath a portion of the flange end of the platter. It is a further feature to provide a handle member made of wood in block-like form which does not conduct heat to the fingers of the operator when they are inserted into the recess of the handle preparatory to lifting a hot platter.

With my platter and handles therefor, it is not only easy to pick up a hot platter from a surface, but the platter may be placed on the dinner table and the contents of the platter consumed without the heat of the platter damaging the surface of the table due to the fact that the platter is raised from the surface of the table when the handles are in position on the platter. It is an important feature to provide a handle which requires no particular manipulation such as tilting or lever action to place the same on the platter. All that is needed is a sliding motion of the handles in a single plane up against the flange end portions of the platter.

The invention will appear more clearly from the following detailed description when taken in connection with the accompanying drawings, showing by way of example a preferred embodiment of the inventive idea wherein like numerals are employed to designate like parts throughout:

Figure 1:
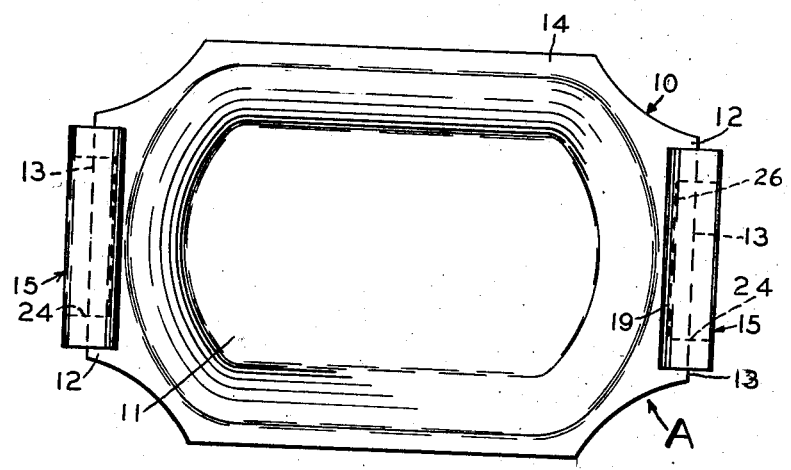
Figure 1 is a top plan view of my platter with the handles in operative position thereon.

Referring to the drawings in detail, my platter A with removable self-engaging handles is composed of a platter 10 which is formed with the well portion 11. The platter A is also formed with the extended end flange portions 12 having the straight outer edge 13. Extending along the sides of the well portion 11 are the flange portions 14 which connect with the end flange portions 13 thereby forming a peripheral flange around the platter.

Figure 2:
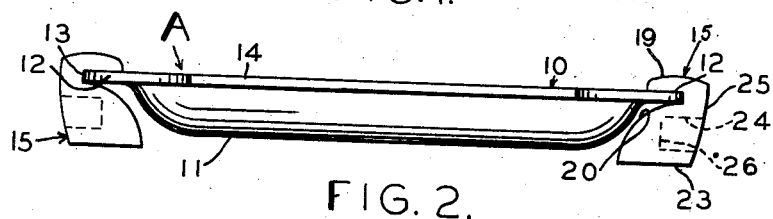
Figure 2 is a longitudinal side view thereof.
Figure 3:
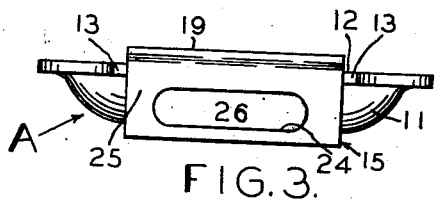
Figure 3 is an end view thereof.
Figure 4:
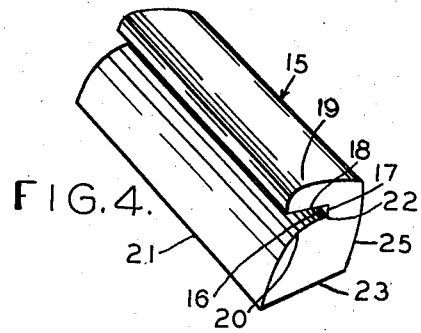
Figure 4 is a perspective view of one of the handles.

I further provide the handles 15 which are identical and particularly illustrated in Figure 4. The handle 15 is preferably made of wood because of its low heat conductivity but may be made of plastic or other composition. The handle 15 is substantially elongated in form and has formed therein, and running longitudinally thereof, the recess or slot 16. The slot 16 terminates at 17 which is in the form of a shoulder against which the edge 13 of the flange portion 12 abuts when the handle is fully in position on the flange portion 12 as particularly shown in Figure 2. The slot 16 is also defined by the upper edge 18 which is the under surface of the extended portion 19. The handle is further formed with the arcuate ramp portion 20 which extends upwardly from the edge 21 and angularly to the lower corner edge 22 of the slot 16. The wide bottom surface 23 of the handle 15 provides for stability in the sliding movement of the handle and is formed so that when the platter 10 is in the position shown in Figure 2, the upper surface of the flange 12 is flush against and fully in contact with the under surface 18 of the extended portion 19 and the edge 13 is in engagement with the shoulder 17.

In this position the weight of the platter tends to force the flange portion 12 into the recess 16 and the upper surface of the flange end portions 12 upwardly against the under surface 18 of the extended portions 19, and the greater the weight on the platter portion 10 the more securely the handles 15 are held in position on the platter. The recess 16 adjacent the shoulder 17 is formed of such a dimension that the flange end portion 12 snugly fits therein by slight frictional engagement.

My handle 15 is further constructed with the recess 24 which is formed in the outer side portion 25. This recess 24 is of sufficient length that the fingers of the operator may be inserted therein to move the handles into engagement with the platter and also lift the platter when the handles 15 are in full engagement. The finger recess 24 is of sufficient depth that the inner wall 26 thereof is beneath a portion of the end flange 12 thereby allowing for more secure engagement of the handle with the platter when the platter is lifted, for the ends of the fingers of the operator are under a portion of the end flange portion 12.

As heretofore indicated the handle 15 is formed with the wide bottom portion 23 which extends from the juncture with the side portion 25 to a point beyond the outer edge of the extended portion 19. The handle 15 is engageable with the platter in positive secured position by a mere sliding of the handle in a single plane against the flange with no tilting or lever action of the handle whatever.

The invention is not to be understood as restricted to the details set forth since these may be modified within the scope of the appended claims without departing from the spirit and scope of the invention.

Having thus described the invention, what I claim as new and desire to secure by Letters Patent is:

1. A platter having end flanges in combination with a pair of handles each composed of a body portion having a slot formed therein, and an enlarged substantially flat base portion for maintaining said handles in an upright position, a ramp formed on said body portion extending from said base portion to said slot for directing the flange of said platter into said slot when said body portion is slid toward the flange with said ramp of said handle forced against the flange of said platter.

2. The combination of a platter having a flange and a pair of removable handles each consisting of a body member having a recess formed therein adapted to receive said flange, an arcuate ramp formed on a portion of said body member leading to said recess and an enlarged substantially flat base surface to maintain said body portion in an upright position when the same is moved upon a surface in a single plane and a centrally disposed finger receiving recess formed in the outer side of said body member and extending under a portion of said recess.

3. A handle for a platter having a peripheral flange, said handle comprising a body portion, said body portion having a slot formed therein adapted to receive the flange, said body portion having a flat bottom surface, a ramp portion extending upwardly from the bottom of said body portion and into said slot for directing the flange of the platter into said slot when said ramp of the handle is forced against the flange of the platter.

4. In a handle for a platter formed with a flange, a body portion having a slot formed therein, an arcuate ramp formed on said body portion and leading to said slot adapted to direct the flange of the platter into said slot when said handle is forced against the flange of the platter with said ramp portion in contact therewith, said body portion having a flat base flat throughout the area thereof, and a finger receiving recess formed in said body portion opposite said ramp and between the top and bottom surfaces of said body portion.

5. A metal platter for hot edibles, including end flanges, in combination with lifting and carrying handles formed entirely of non-metallic material to insulate the heat of the platter from the hands when carrying said platter, a slot formed in each of said handles, a cam surface formed in the body of said handles and extending from the bottom surface to said slot, said handles being automatically attachable to said platter by pressing said handles toward the end flanges of said platter thereby attaching said handles to the platter and providing a heat insulating carrying means and a support for holding said hot platter off of a surface supporting said handles.

6. The combination of a broiler plate having an outwardly extending peripheral flange and removable insulating handles, said handles having a substantially flat rectangular base, an upwardly extending arcuate outer surface having a finger engaging opening centrally disposed therein, an arcuate top surface, an inner surface having an arcuate convex cam surface extending upwardly from the base portion throughout the length of said handles, a longitudinally extending slot formed at the upper end of said arcuate cam surface for engagement with said platter, a substantially flat surface disposed inwardly from said slot and extending into confluence with said arcuate top surface of said handle, said cam surface being engageable with the flange of said platter when said handles are forced inwardly against said platter into engagement therewith to cause the flanges of said platter to slide upwardly along said cam surface thereby raising said platter from the surface upon which the base portions of said handles are resting.

References Cited in the file of this patent

UNITED STATES PATENTS

| | | |
|---|---|---|
| 1,074,173 | Hines | Sept. 30, 1913 |
| 1,265,338 | Jenks | May 7, 1918 |
| 2,211,030 | Rutenber | Aug. 13, 1940 |
| 2,212,065 | Fischer | Aug. 20, 1940 |
| 2,487,559 | Kraemer | Nov. 8, 1949 |
| 2,547,844 | Wickland | Apr. 3, 1951 |
| 2,574,411 | Pashby | Nov. 6, 1951 |

FOREIGN PATENTS

| | | |
|---|---|---|
| 6,503 | Great Britain | Mar. 15, 1912 |
| 443,389 | Great Britain | Feb. 27, 1936 |
| 1,041,951 | France | June 3, 1953 |